US008511868B2

(12) United States Patent
Haugaard et al.

(10) Patent No.: US 8,511,868 B2
(45) Date of Patent: Aug. 20, 2013

(54) REMOTE BALLAST HOUSING WITH AIRFLOW CHANNEL

(75) Inventors: Eric J. Haugaard, Kenosha, WI (US); Russell S. Schultz, Racine, WI (US)

(73) Assignee: Cree, Inc., Durham, NC (US)

( * ) Notice: Subject to any disclaimer, the term of this patent is extended or adjusted under 35 U.S.C. 154(b) by 302 days.

(21) Appl. No.: 11/695,158

(22) Filed: Apr. 2, 2007

(65) Prior Publication Data

US 2008/0239731 A1 Oct. 2, 2008

(51) Int. Cl.

| | |
|---|---|
| ***B60Q 1/06*** | (2006.01) |
| ***F21V 29/00*** | (2006.01) |
| ***F21V 7/20*** | (2006.01) |
| ***E01F 9/00*** | (2006.01) |

(52) U.S. Cl.

USPC .......................... 362/373; 362/153.1; 362/218

(58) Field of Classification Search

USPC ....................................... 362/218, 373, 153.1

See application file for complete search history.

(56) References Cited

U.S. PATENT DOCUMENTS

| | | | | |
|---|---|---|---|---|
| 3,457,399 | A * | 7/1969 | Milroy | 362/267 |
| 3,459,934 | A * | 8/1969 | Moore | 362/294 |
| 3,883,732 | A * | 5/1975 | Peterson et al. | 362/294 |
| 4,164,783 | A | 8/1979 | Wandler | |
| 5,136,489 | A * | 8/1992 | Cheng et al. | 362/294 |
| 5,136,493 | A * | 8/1992 | Straus et al. | 362/373 |
| 5,339,234 | A * | 8/1994 | Russello et al. | 362/419 |
| 5,386,354 | A * | 1/1995 | Osteen | 362/258 |
| 5,918,970 | A | 7/1999 | Brohard et al. | |
| 5,941,632 | A | 8/1999 | Wedell et al. | |
| 5,947,592 | A * | 9/1999 | Barlow | 362/345 |
| 6,059,427 | A | 5/2000 | Wedell et al. | |
| 6,095,671 | A * | 8/2000 | Hutain | 362/373 |
| 6,350,046 | B1 | 2/2002 | Lau | |
| 6,419,378 | B1 | 7/2002 | Wedell et al. | |
| 6,545,429 | B1 | 4/2003 | Flory, IV | |
| 6,601,975 | B1 * | 8/2003 | Haugaard et al. | 362/362 |
| 6,607,292 | B2 * | 8/2003 | Gutierrez et al. | 362/371 |
| 6,609,816 | B2 | 8/2003 | Ansari et al. | |
| 6,746,325 | B2 * | 6/2004 | Crane | 454/342 |
| 6,848,806 | B2 * | 2/2005 | Yoshida et al. | 362/147 |
| 6,905,222 | B1 | 6/2005 | Russello et al. | |
| 7,099,153 | B2 | 8/2006 | Yazawa | |
| 7,111,957 | B2 * | 9/2006 | Bernhart et al. | 362/147 |
| 7,128,132 | B2 | 10/2006 | Kao et al. | |
| 7,130,507 | B2 * | 10/2006 | Gawalkiewicz et al. | 385/39 |
| 7,284,877 | B2 * | 10/2007 | Haugaard et al. | 362/147 |
| 7,494,251 | B1 * | 2/2009 | Kira | 362/294 |
| 2003/0210549 | A1 * | 11/2003 | Sears et al. | 362/265 |
| 2005/0122725 | A1 * | 6/2005 | Whitlow et al. | 362/382 |

* cited by examiner

*Primary Examiner* — David J Makiya

(74) *Attorney, Agent, or Firm* — Jansson Munger McKinley & Shape Ltd.

(57) ABSTRACT

A high-intensity discharge lighting fixture of the type having an optics housing and optics components mounted therein, the fixture comprises a ballast housing having a first member and a second member including at least one airflow channel integrally formed therein, the airflow channel is positioned immediately adjacent the optics housing and is adapted to facilitate free airflow between the ballast housing and the optics housing whereby heat is dissipated from the lighting fixture to the atmosphere.

16 Claims, 10 Drawing Sheets

REMOTE BALLAST HOUSING WITH AIRFLOW CHANNEL

FIELD OF THE INVENTION

This field relates generally to commercial lighting fixtures, such as outdoor commercial lighting fixtures, and more specifically to such outdoor commercial lighting fixtures having high-intensity discharge lamps.

BACKGROUND OF THE INVENTION

Commercial outdoor lighting fixtures are important not only for the safety and security they provide, but also for their aesthetic contribution to the environment. Such fixtures should blend harmoniously with the landscape while maintaining their utilitarian characteristics. Outdoor lighting fixtures are commonly used in public ways, recreational areas, parking lots, walkways and the like. High-intensity discharge lighting is most commonly used in outdoor applications where a lot of light is required. Among advances in outdoor commercial lighting fixtures are the fixtures disclosed in U.S. Pat. No. 7,097,330 (Outdoor Lighting Fixture); U.S. Pat. No. 6,481,867 (Modular Luminaire Assembly); U.S. Pat. No. 5,918,970 (Outdoor Luminaire Assembly); and U.S. Pat. No. 4,595,971 (Vented Luminaire Fixture).

Despite these and other such advances in the field there remains a need for further improvement in outdoor commercial lighting fixtures, preferably without compromising the advantages previously provided including those related to ease of manufacture, storage, shipment, installation, etc.

Because outdoor commercial fixtures are often large, such fixtures of the prior art suffer from several disadvantages. For example, overheating is a common problem in such lighting fixtures. Among the overheating problems with certain devices of the prior art is a problem of inadequate heat dissipation away from power-related components such as ballasts, lamps and lamp sockets. Certain components, particularly capacitors, ballasts and ignitors, etc., are limited in their ability to tolerate high temperatures. It is critical to the life of certain components, mainly those that are particularly heat-sensitive, that steps be taken to prevent costly damage or, worse, a premature end of the life of the fixture. Overheating can damage power-related components which compromises the longevity of the lighting fixture and its components. Minimal gains in temperature reduction yield very substantial gains in component life and, therefore, in overall fixture longevity.

Commercial outdoor lighting fixtures of the prior art have attempted to solve the substantial problem of overheating. These attempts include, for example, the use of cooling fans, barriers and other insulating features, thermal protection devices, and housings having one or more external power-related components. Each of these attempts to address the concern of overheating have disadvantages and, in some cases, have exacerbated the problem. Additionally, lighting fixtures of the prior art show that certain attempts to contain any overheating have made achieving a pleasing appearance difficult at best. While commercial outdoor lighting fixtures are critical for safety of an area, the appearance of such fixtures has long been sacrificed in the interests of pure utility. As such, there remains a need for such lighting fixtures that can improve the appearance of outdoor environments while still providing necessary safety and security by enhancing visibility.

In addition to overheating concerns, certain fixtures of the prior art sacrifice space within the optics housing by incorporating the power-related components within the same housing. This reduces the space available for the reflector which in turn reduces the performance of the fixture. The larger the reflector, the better the directivity performance and overall efficiency and lighting performance. There is, therefore, a further need for outdoor commercial lighting fixtures having improved efficiency and a pleasing appearance.

The benefits realized in being able to accomplish these two goals—namely improving the overall appearance of such lighting fixtures while reducing overheating of the fixture—would be significant. Accordingly, there remains in the art a need to provide an overhead commercial lighting fixture that more effectively removes heat from the housing, without sacrificing other advantages of benefits realized from earlier development work.

OBJECTS

It is an object to provide a high-intensity discharge commercial lighting fixture overcoming some of the problems and shortcomings of the prior art.

Another object is to provide a high-intensity discharge lighting fixture which has improved heat dissipation wherein heat is transferred from the housing of the lighting fixture into the atmosphere.

A further object is to provide a high-intensity discharge lighting fixture that has an aesthetically pleasing appearance while still retaining functionality.

Yet another object is to provide a high-intensity discharge lighting fixture with thermally isolated ballast housing and optics housing.

Another object is to provide a high-intensity discharge lighting fixture having wiring that can be quickly disconnected for maintenance and replacement.

A further object is to provide a high-intensity discharge lighting fixture having easy access to electrical components for maintenance, repair and replacement.

Yet another object is to provide a commercial lighting fixture which maximizes the space in the optics housing by mounting the power-related components in a separate housing.

Another object is to provide an improved overhead commercial lighting fixture that is inexpensive to manufacture and easy to install.

Still another object is to provide an improved overhead commercial lighting fixture which is compact and yet free of problems of overheating critical components.

Yet another object is to provide an improved high-intensity discharge lighting fixture having improved longevity.

These and other objects will be apparent from the following description and drawings.

SUMMARY

According to the invention, a high-intensity discharge lighting fixture is provided having an optics housing and optics components mounted therein. The fixture comprises a ballast housing that includes a first and a second member. The ballast housing further comprises at least one airflow channel integrally formed therein. The airflow channel is positioned immediately adjacent the optics housing and facilitates free airflow between the ballast housing and optics housing. Heat, therefore, is dissipated from the lighting fixture to the atmosphere.

In certain preferred embodiments, the second member of the ballast housing includes a proximal endwall and the airflow channel is formed therein. In such a preferred embodiment, the proximal endwall has an outer surface and the airflow channel is recessed with respect to the outer surface.

In highly preferred embodiments, the lighting fixture comprises two airflow channels formed in the proximal endwall.

In most preferred embodiments, the ballast housing further comprises power-related components and the power-related components are mounted with respect to the first member. Further details, advantages and features of this invention are given by the following description with reference to the enclosed drawings.

DETAILED DESCRIPTION

Figure 1:
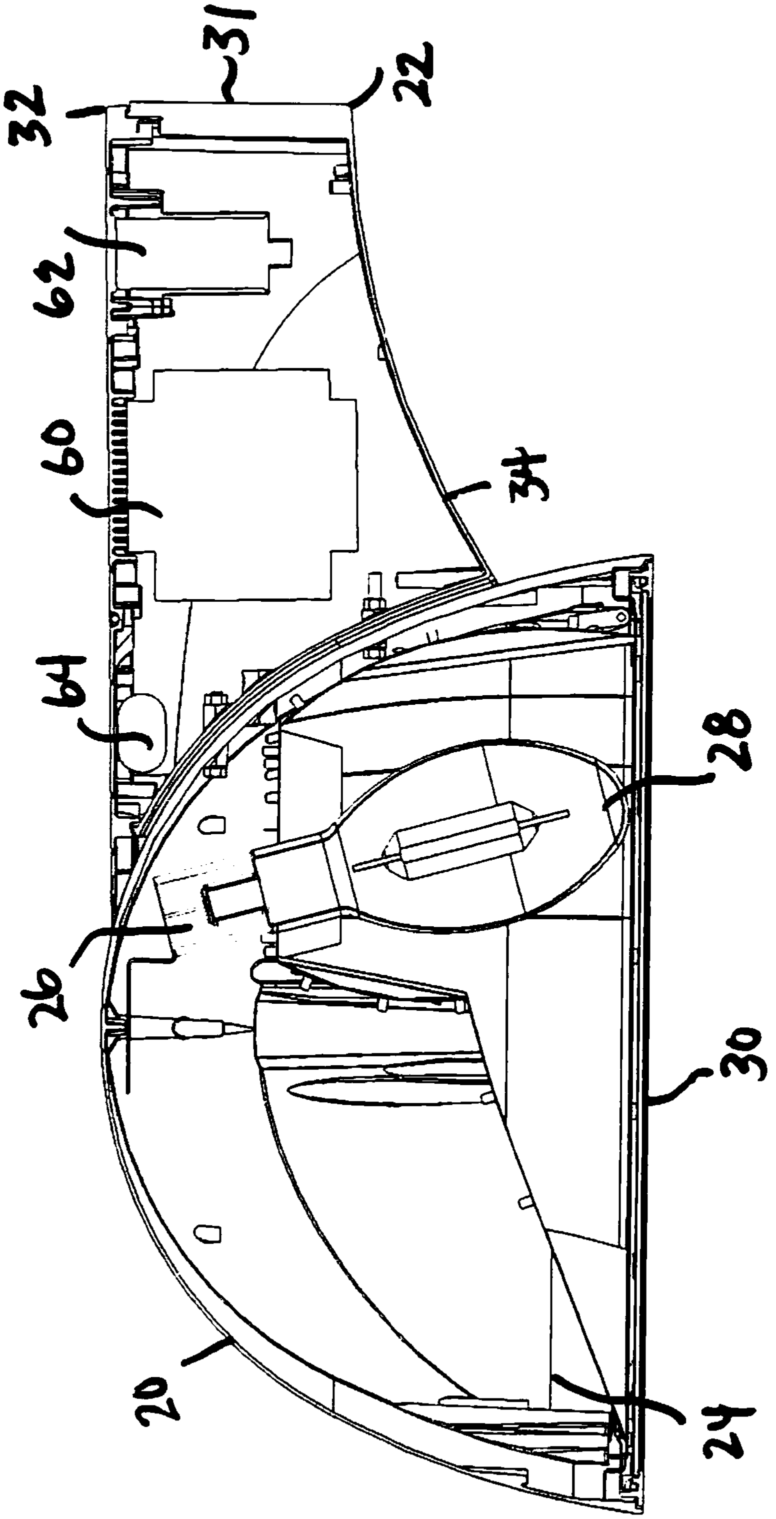
FIG. 1 shows a cross-sectional view of a first embodiment of the high-intensity discharge lighting fixture.
Figure 10:
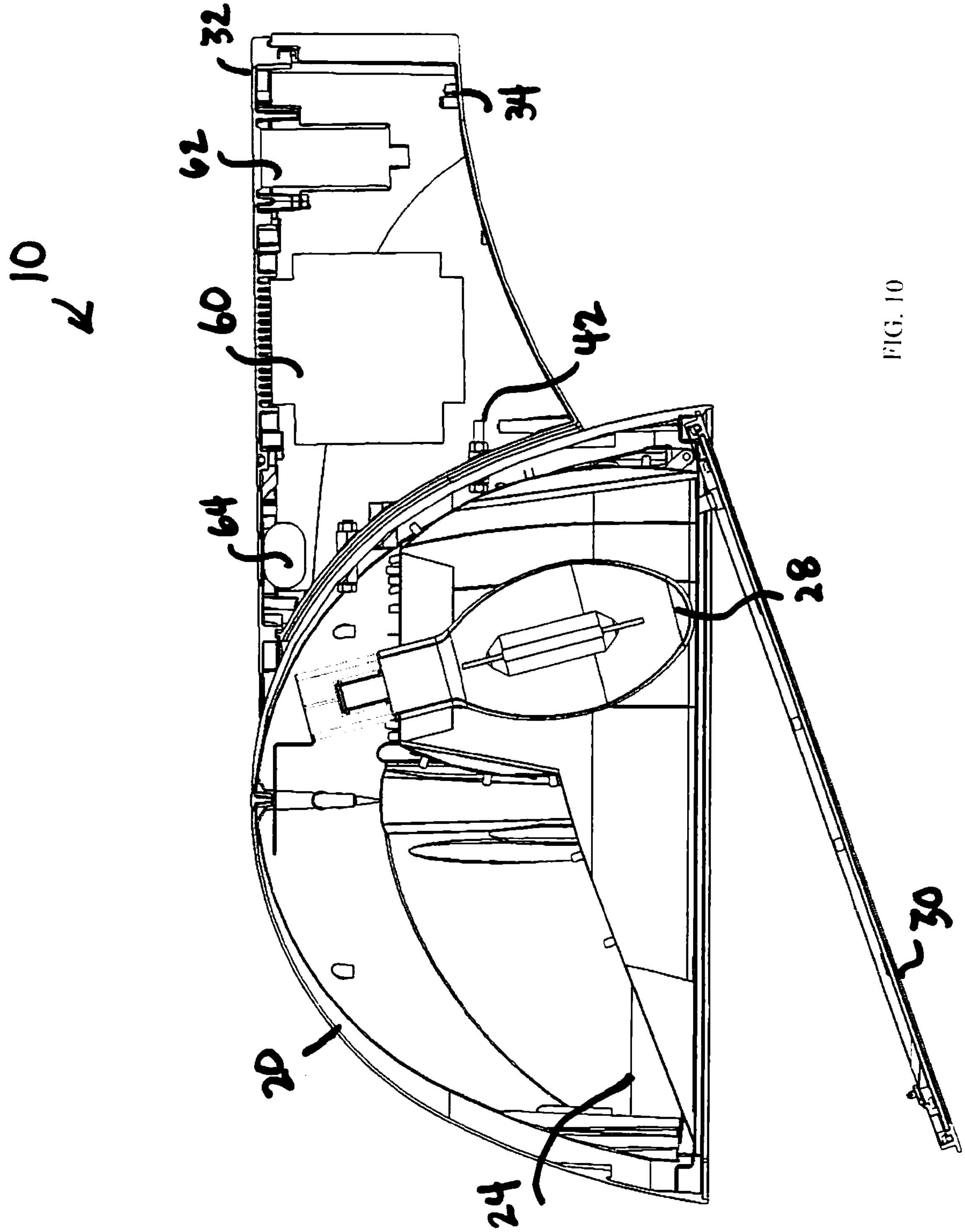
FIG. 10 is another cross-sectional view of the lighting fixture of FIG. 1 where the optics housing is in its open position.

FIG. 1 illustrates a preferred embodiment of the high-intensity discharge lighting fixture, wherein the lighting fixture 10 is illustrated in cross-section. As shown in FIGS. 1 and 10, lighting fixture 10 comprises an optics housing 20 and a separate ballast housing 22. Optics housing 20 includes the optical components, namely, at least a reflector 24, a lamp holder 26, a lamp 28 and a lens 30. Though lighting fixture 10 preferably includes a high-intensity discharge lamp, other types of lamps could be used. Ballast housing 22, as illustrated, is a side-arm housing having an arcuate shape. However, it should be recognized that ballast housing 22 may have other shapes, for example, a rectangular-shaped arm. Ballast housing 22 may be of any shape suitable for separately housing the power-related components and for supporting optics housing 20. Ballast housing 20 includes a distal endwall 31 that is adapted for pole mounting. Both optics housing 20 and ballast housing 22 are preferably made of seamless, die-cast aluminum.

Figure 3:
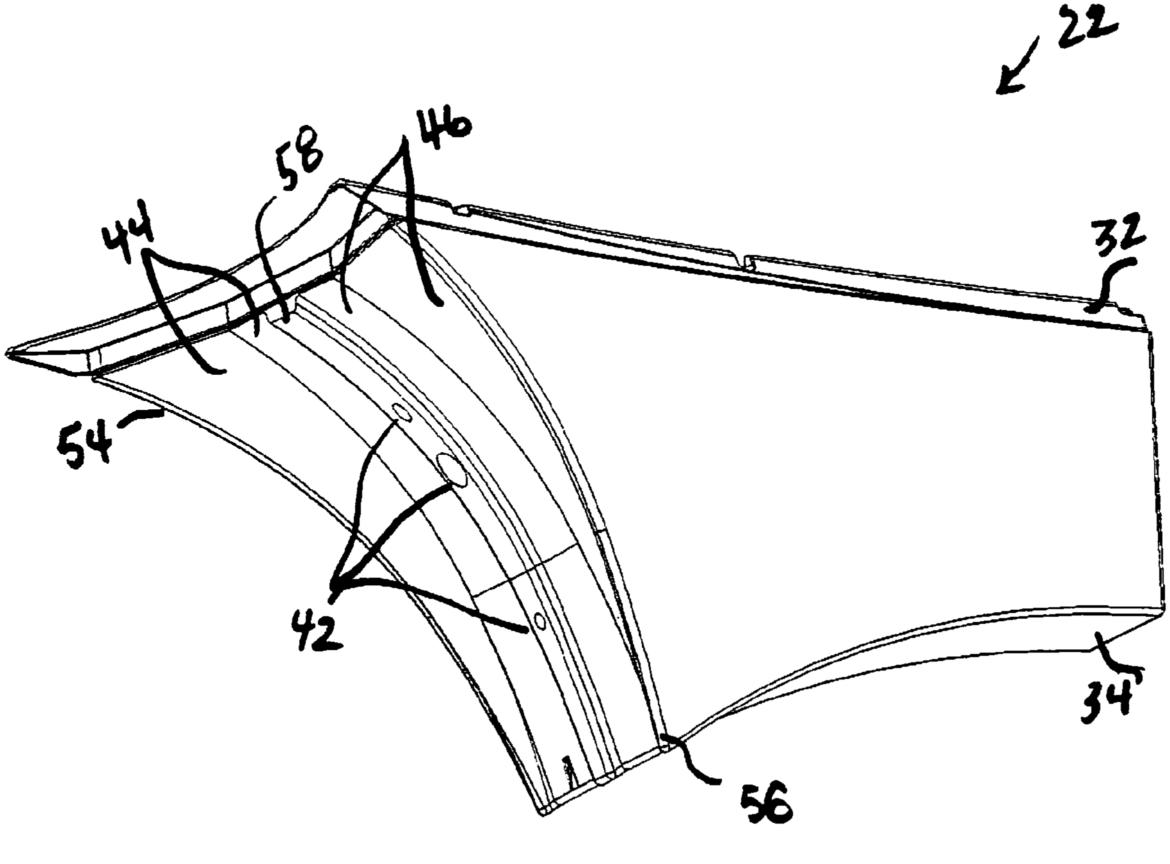
FIG. 3 is yet another side perspective view of the ballast housing of FIG. 1.
Figure 6:
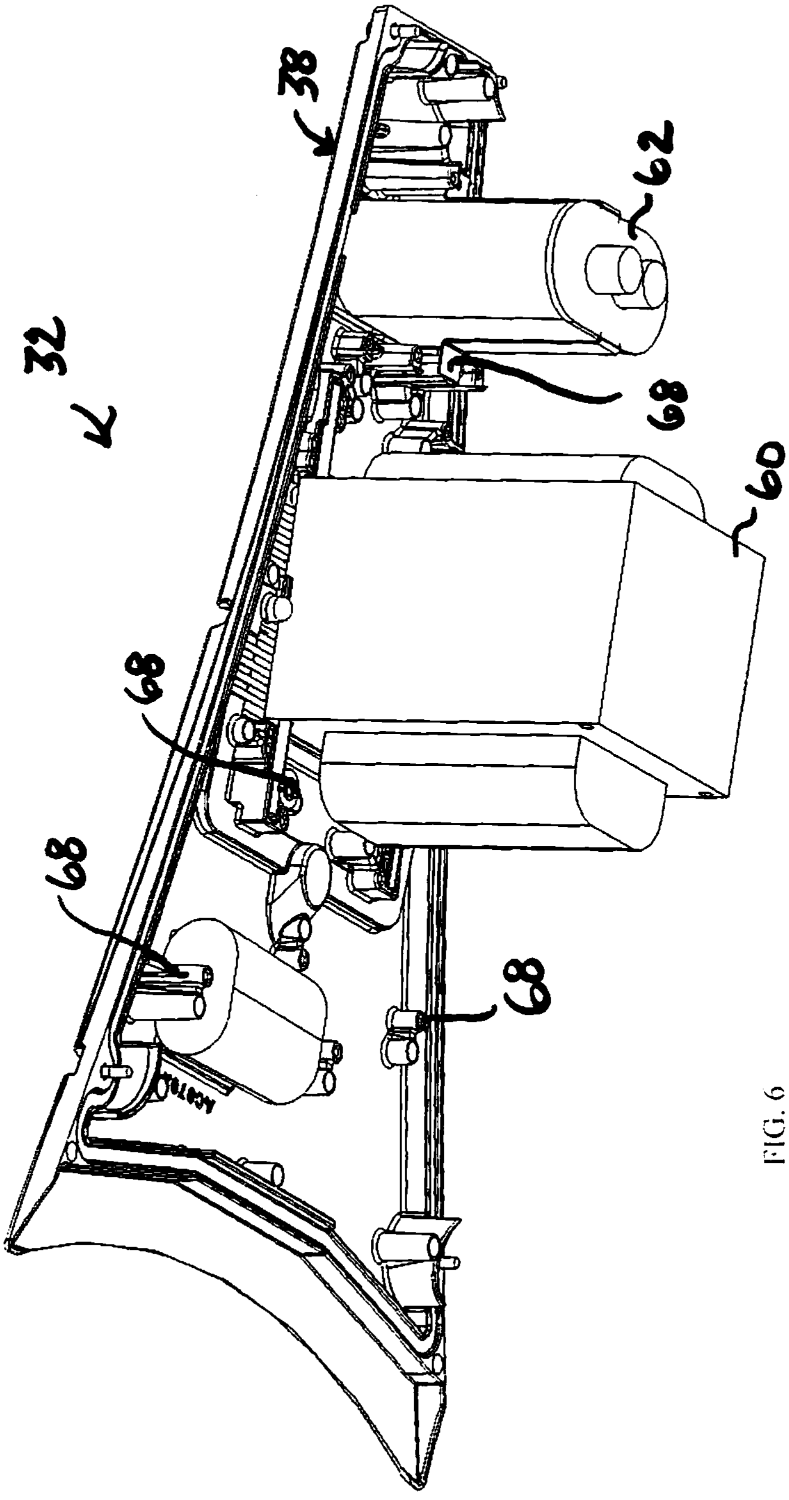
FIG. 6 is a perspective view of the first member of the ballast housing of FIG. 1.
Figure 7:
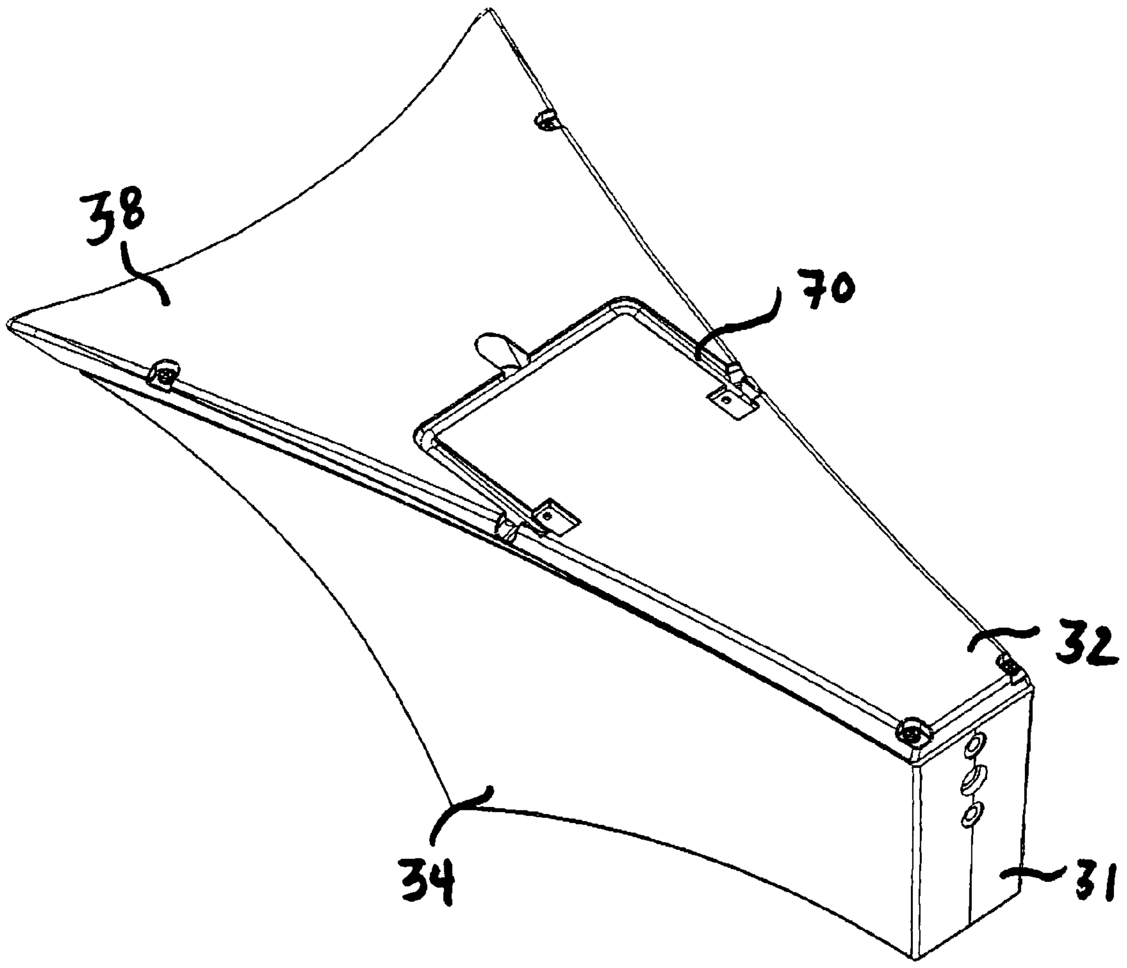
FIG. 7 shows is a further side perspective view of the ballast housing of FIG. 1.

As shown in FIGS. 3 and 7, ballast housing 22 includes a first member 32 and a second member 34. First member 32 is preferably a top member and second member 34 is preferably a bottom member. First member 32 and second member 34 together form a substantially sealed space. As shown in FIG. 7, first member 32 and second member 34 are attached along the periphery by bolts. It should be understood that, while bolts are shown, any suitable closure may be used. First member 32 has an interior surface 36 and an exterior surface 38. As seen in FIG. 6, ballast housing 22 preferably includes a water/air-tight sealing closure 40 along interior surface 36. The closure can be, for example, a gasket as shown in FIG. 6 or any other suitable sealing structure. Water/air-tight sealing closure 40 is positioned along the periphery of first member 32 to sealingly engage second member 34.

Figure 9:
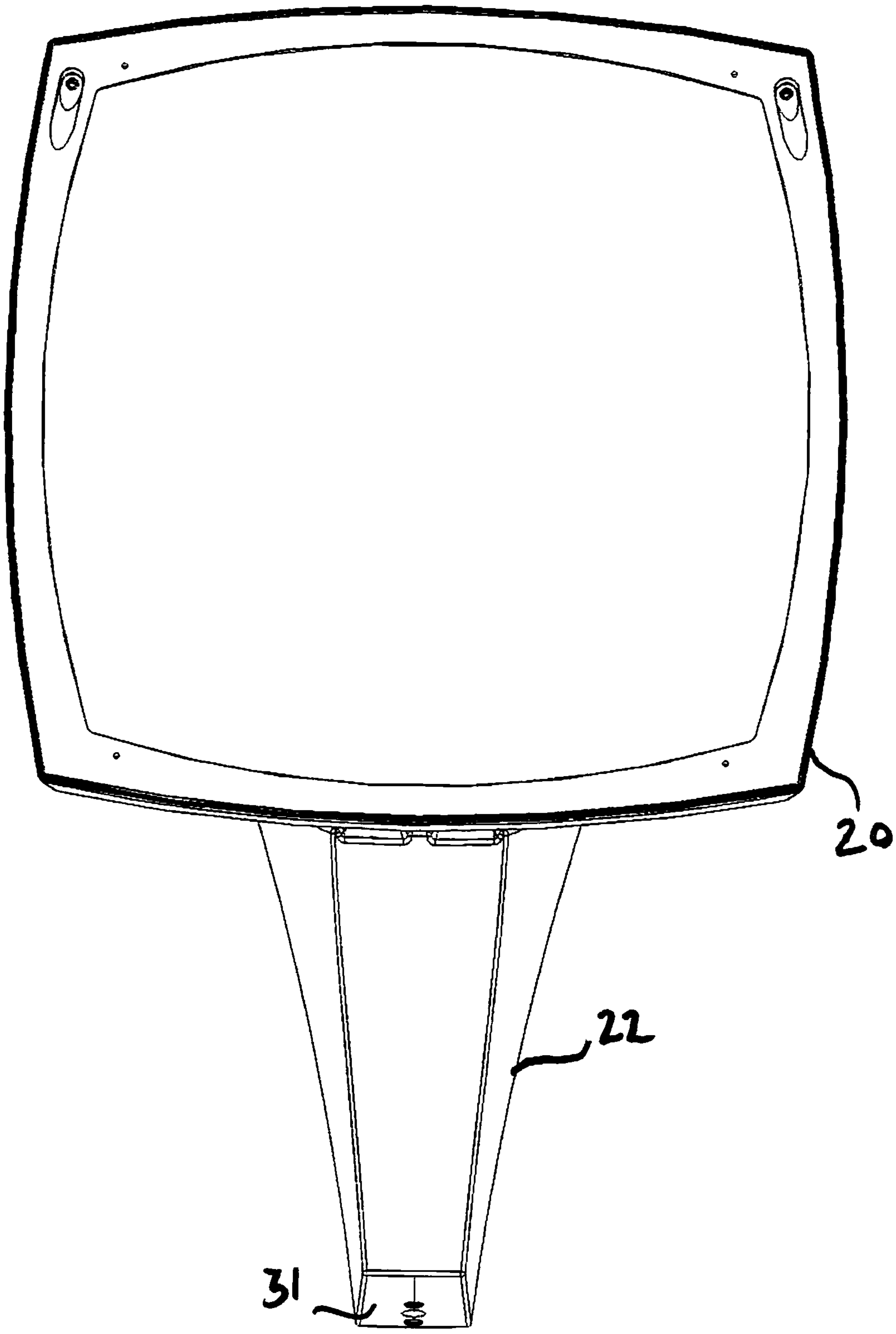
FIG. 9 is a bottom plan view of the lighting fixture of FIG. 1.

Referring next to FIGS. 1 and 10, it is shown that optics housing 20 is positioned immediately adjacent ballast housing 22. As shown in FIGS. 3 and 9, ballast housing 22 is securely attached to optics housing 20 at a plurality of securement points 42. As illustrated, ballast housing 22 includes three securement points 42. Securement points 42 are designed to receive bolts and thereby secure ballast housing 22 to optics housing 20. When tightened, the bolts ensure that ballast housing 22 is securely attached to optics housing 20. It should be understood that while bolts are shown, any appropriate type of securement may be used. When tightened, the bolts further ensure that edges of ballast housing are tightly engaged with optics housing 20.

Figure 8:
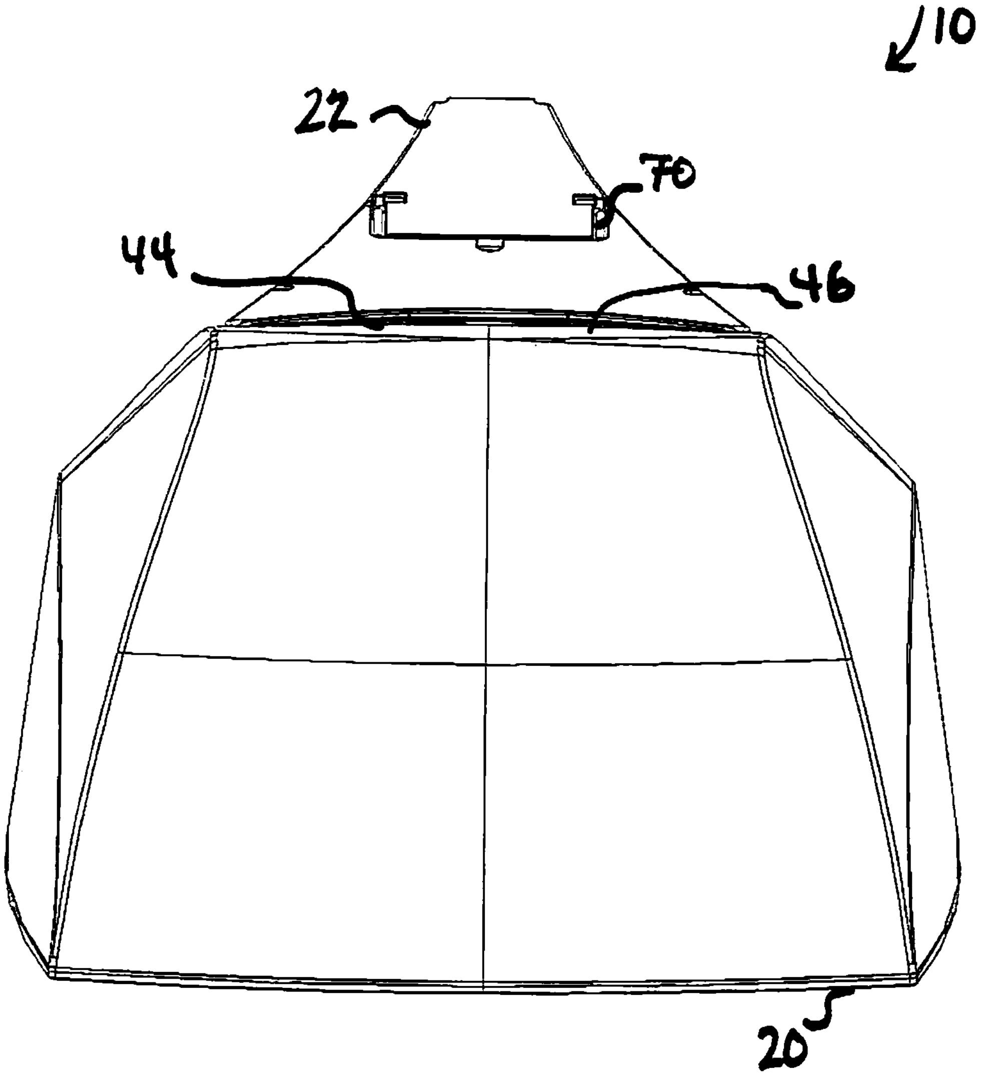
FIG. 8 is a top plan view of the lighting fixture of FIG. 1.

Ballast housing 22 further includes first and second airflow channels, 44 and 46 respectively, integrally formed in second member 34. Airflow channels 44 and 46 serve the purpose of facilitating free airflow and dissipating heat created by certain optical components and electrical components to the atmosphere. While two airflow channels are illustrated, ballast housing 22 may include one or a plurality of airflow channels. FIG. 3 illustrates lighting fixture 10 wherein optics housing 20 is removed from ballast housing 22. As illustrated, second member 34 includes a proximal endwall 48. Airflow channels 44 and 46 are formed in proximal endwall 48 of second member 34 and are positioned immediately adjacent optics housing 20. Proximal endwall 48 includes a center surface 58 that separates airflow channels 44 and 46. The separation of airflow channels 44 and 46 reduces thermal contact of the heat conductive channels. It further facilitates improved heat dissipation by preventing heat transfer between the two radiant surfaces. FIGS. 8 and 9 illustrate that airflow channels 44 and 46 extend through ballast housing 22 from top to bottom whereby heat transfer through airflow channels 44 and 46 and to the atmosphere is facilitated. As shown, airflow channels 44 and 46 are substantially vertical to further facilitate airflow convection and heat dissipation.

Figure 2:
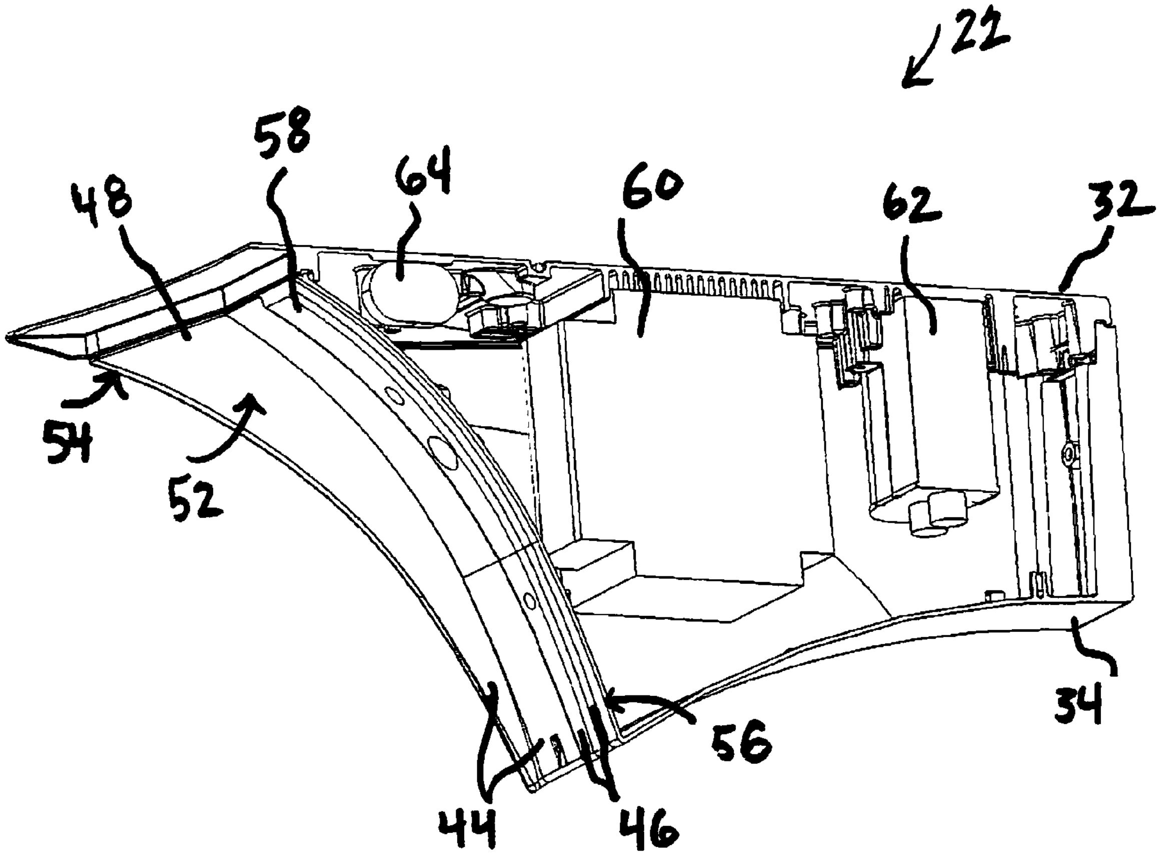
FIG. 2 shows a side perspective view of the ballast housing of FIG. 1.
Figure 4:
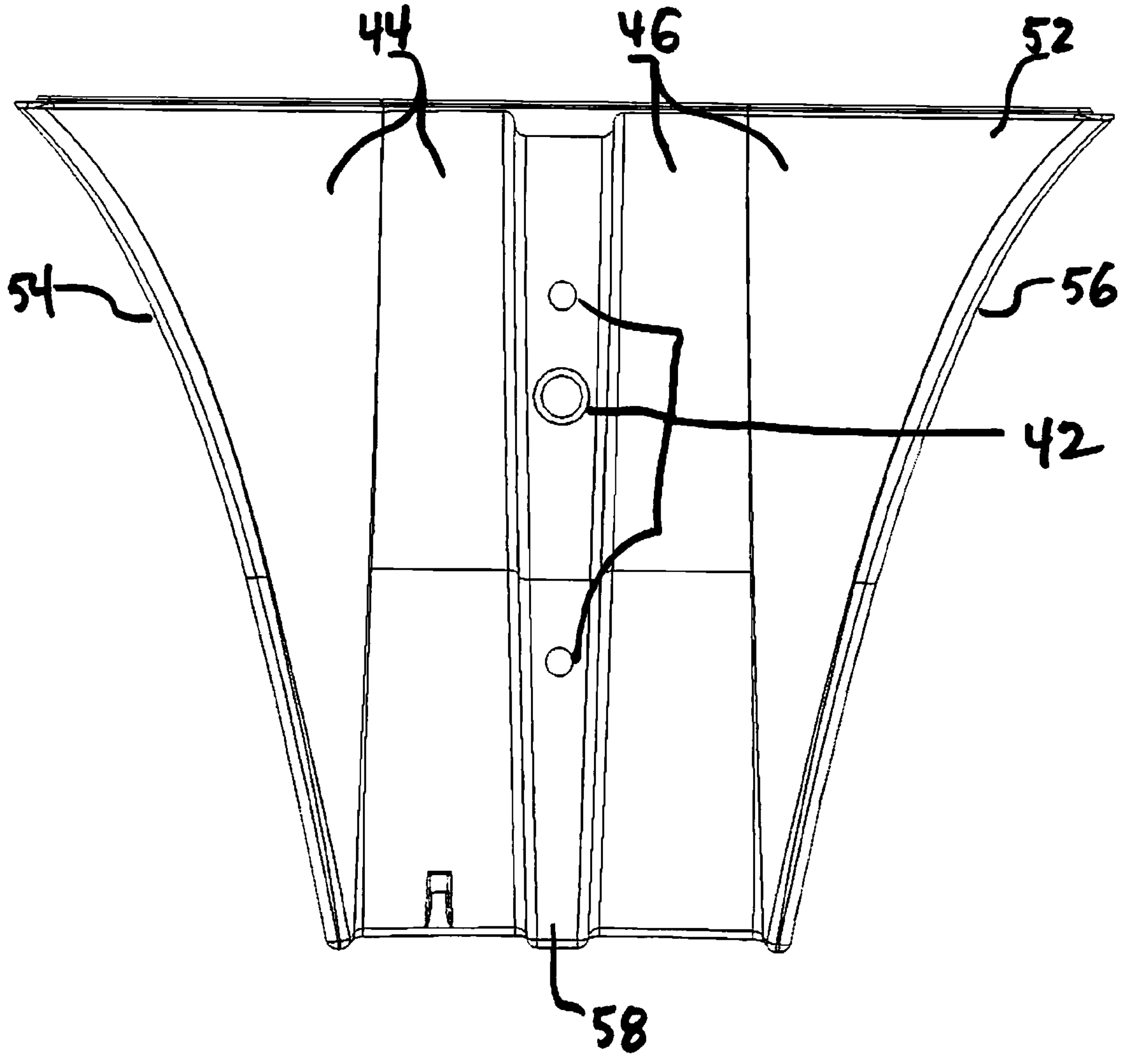
FIG. 4 shows a front perspective view of the ballast housing of FIG. 1, with the optics housing being removed to show the outer surface of the ballast housing.
Figure 5:
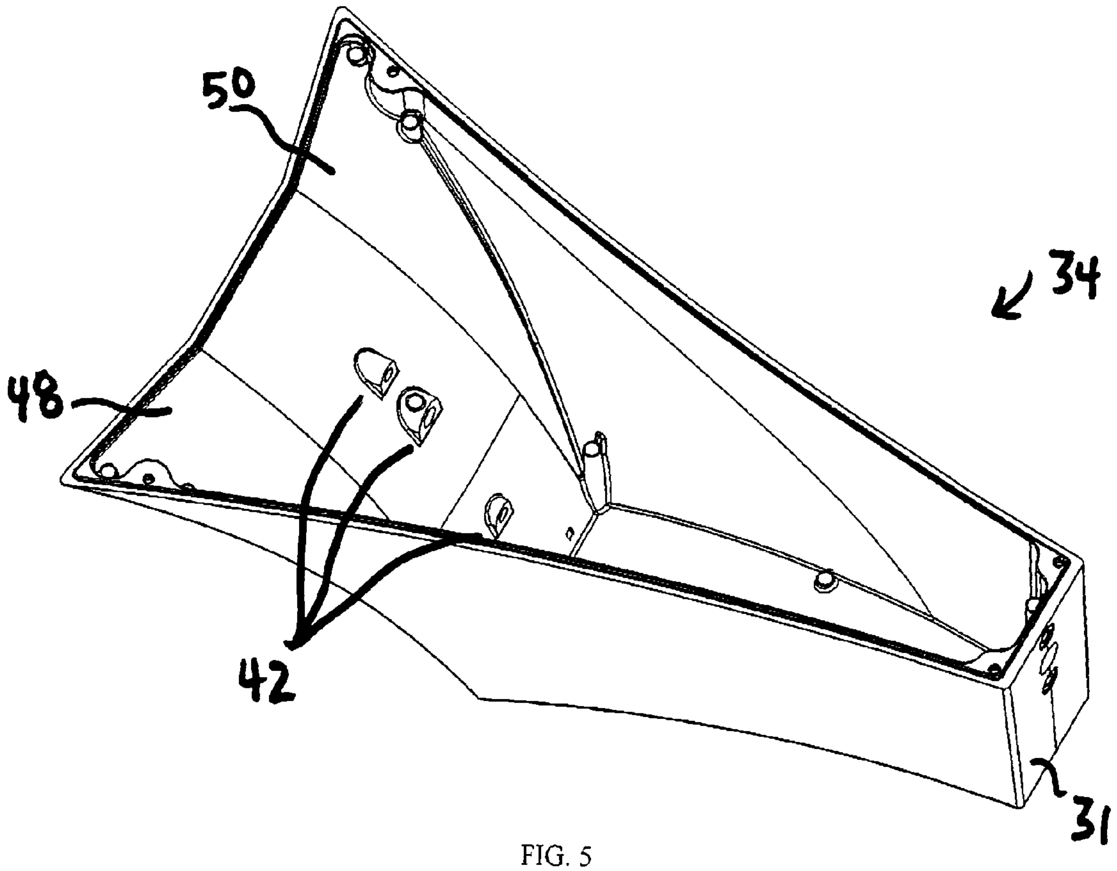
FIG. 5 is a top perspective view of the second member of the ballast housing of FIG. 1.

FIGS. 2 through 4 illustrate details of airflow channels 44 and 46 with respect to proximal endwall 48. As shown, airflow channels 44 and 46 are recessed in proximal endwall 48. Proximal endwall 48 has an interior surface 50 and an exterior surface 52. One skilled in the art will recognize that increasing the separation between airflow channels 44 and 46 would further facilitate increased air circulation to dissipate heat to the atmosphere. Referring to FIG. 3, it is seen that airflow channels 44 and 46 are generally concave shaped with respect to exterior surface 52 of proximal endwall 48. Conversely, FIG. 5 is an interior plan view of second member 34. Airflow channels 44 and 46 have a convex shape with respect to interior surface 50 of proximal endwall 48.

The airflow channels 44 and 46 reduce in cross-sectional area toward first and second outer edges, 54 and 56 respectively, of second member 34 so that portions of proximal endwall 48 are in direct contact with optics housing 20. As shown in FIGS. 3 and 4, ballast housing 22 is in direct contact with optics housing 20 at three ballast housing 22 surfaces. As discussed above, the center surface 58 of proximal endwall 48 defines a plurality of securement points 42 for securing ballast housing 22 to optics housing 20. Center surface 58 is in direct contact with optics housing 20. First and second outer edges 54 and 56 are also each in direct contact with optics housing 20 for further stability.

Referring now to FIG. 6, ballast housing 22 further includes the power-related components. FIG. 6 is a perspective view of first member 32 of ballast housing 22. As shown, the power-related components include, for example, a ballast 60, a capacitor 62 and an ignitor 64. Ignitor 64 is an optional power component. All of the power-related components are enclosed in and mounted with respect to interior surface 36 of second member 34 of ballast housing 22. Interior surface 36 of second member 34 includes a plurality of fastener members 68, adapted to receive and secure power-related components to second member 34.

Second member 34 of ballast housing 22 serves as a heat sink for the power-related components. The power-related components are in direct thermal contact with interior surface 36 of second member 34. Ballast 60 is shown as mounted on a paneled surface. Capacitor 62 and ignitor 64 are shown mounted on flat interior surface 36. This arrangement also facilitates preferential heat dissipation from the power-related components and to the atmosphere through second member 34.

FIGS. 7 and 8 show a top perspective view of ballast housing 22. Second member 34 of ballast housing 22 includes a handle 70 recessed with respect to exterior surface 38. Recessed handle 70 is adapted to facilitate maintenance and repair of lighting fixture 10. When lighting fixture 10 requires maintenance or repair, the bolts securing second member 34 to first member 32 are loosened and then, using recessed handle 70, second member 34 is lifted off of first member 32. Further, the lamp wiring and circuit power wiring are connected with mate and lock connectors so that the wiring may be quickly disconnected for easier maintenance and repair.

Finally, FIG. 10 illustrates lighting fixture 10 with optics housing 20 in an open position. As shown, lens 30 is hingedly secured to optics housing 20. Optics housing 20 includes a die-cast aluminum door frame that secures lens 30 to optics housing 20. A silicone gasket is further provided to facilitate sealing engagement of the lens frame to optics housing 20, thereby protecting lens 30 from water, insects and debris.

A wide variety of materials are available for the various parts discussed and illustrated herein. Although the high-intensity discharge lighting fixture has been shown and described in conjunction with specific embodiments thereof, it is to be understood that many alternatives, modifications and variations will be apparent to those skilled in the art. Accordingly, it is intended to embrace all such alternatives, modifications and variations that fall within the spirit and broad scope of the appended claims.

The invention claimed is:

1. A high-intensity discharge lighting fixture comprising:

a ballast housing having a an interior volume, the ballast housing including upper, lower and side walls, a rear wall for abutment to a mounting surface and a forward wall having forwardly projecting edge portions;

an optics housing having an optics housing outer surface and an interior volume containing optical elements that is mutually exclusive of the ballast housing interior volume; and the forwardly projecting edge portions alone with the outer surface of the optics housing define at least one airflow channel having at least one opening between the optics housing outer surface and the forwardly projecting edge portions of the ballast housing to facilitate free airflow between the ballast housing and the optics housing whereby heat is dissipated from the lighting fixture to the atmosphere.

2. The lighting fixture of claim 1 wherein the forward wall has an outer surface and the at least one airflow channel is recessed with respect to the outer surface.

3. The lighting fixture of claim 1 further including two airflow channels.

4. The lighting fixture of claim 1 wherein the ballast housing further includes power-related components, the power-related components being mounted with respect to the upper wall.

5. The lighting fixture of claim 1 wherein the upper wall is removable with respect to the lower and side walls and rear wall.

6. A high-intensity discharge lighting fixture comprising:

a ballast housing having an interior volume, the ballast housing including at least a forward wall having forwardly projecting edge portions;

an optics housing having an optics housing outer surface and an interior volume containing optical elements that is mutually exclusive of the ballast housing interior volume; and the forwardly projecting edge portions alone with the outer surface of the optics housing define at least one opening positioned between the optics housing outer surface and the forwardly projecting edge portions of the ballast housing and being adapted to facilitate free airflow between the ballast housing and the optics housing whereby heat is dissipated from the lighting fixture to the atmosphere.

7. The lighting fixture of claim 6 wherein the at least one airflow channel is recessed within the forward wall.

8. The lighting fixture of claim 6 further including at least two airflow channels.

9. The lighting fixture of claim 6 wherein the ballast housing further includes a plurality of ballast housing walls including at least an upper wall and power-related components are mounted with respect to the upper wall.

10. The lighting fixture of claim 9 wherein power-related components comprise a ballast.

11. The lighting fixture of claim 9 wherein the plurality of ballast housing walls further includes a lower wall and the upper wall is removable with respect to the lower wall.

12. An outdoor commercial lighting fixture comprising:

a ballast housing having an interior volume and power-related components including at least a ballast therein, the ballast housing further including upper, lower and side walls, a rear wall and a forward wall having forwardly projecting edge portions;

an optics housing attached to the ballast housing forward wall, the optics housing having an optics housing outer surface and an interior volume containing optical elements that is mutually exclusive of the ballast housing interior volume; and the forwardly projecting edge portions and the outer surface of the optics housing alone define an airflow channel having at least one opening between the optics housing outer surface and the forwardly projecting edge portions of the ballast housing adapted to facilitate free airflow between the ballast housing and the optics housing whereby heat is dissipated from the lighting fixture to the atmosphere.

13. The lighting fixture of claim 12 further including at least two airflow channels.

14. The lighting fixture of claim 12 wherein the ballast housing upper wall is removable with respect to the lower wall.

15. The lighting fixture of claim 12 wherein the optics housing includes a high-intensity discharge light source.

16. A high-intensity discharge lighting fixture comprising separate ballast and optics housings defining mutually exclusive interior volumes, the ballast housing containing a ballast and the optics housing containing optical elements, the ballast housing having upper, lower, and side walls, a rear wall for abutment to a mounting surface and a forward wall having forwardly projecting edge portions which alone with an outer surface of the optics housing define at least one air flow channel having at least one opening positioned between the optics housing outer surface and the forwardly projecting edge portions of the ballast housing.

* * * * *